United States Patent Office 3,164,636
Patented Jan. 5, 1965

3,164,636
UNSATURATED ALIPHATIC AMINO-DIOLS
Jean Druey and Erwin Friedrich Jenny, Riehen, Switzerland, assignors to Ciba Corporation, a corporation of Delaware
No Drawing. Filed Aug. 3, 1959, Ser. No. 831,028
Claims priority, application Switzerland, Aug. 15, 1958, 62,944/58
9 Claims. (Cl. 260—584)

The present invention relates to new unsaturated aliphatic amino-diols of the formula $$CH_3(CH_2)_n\text{—}A\text{—}CH(OH)\text{—}CH(NH_2)\text{—}CH_2OH$$

in which A stands for a cis or trans —CH=CH— or —C≡C—radical, and $n$ represents a whole number greater than 12, more especially 13 to 17 and above all 13, in the form of their threo- and erythro and optical isomers, the acyl such as N-acyl and N,O,O-triacyl derivatives of these compounds and the salts, such as therapeutically useful acid addition salts thereof. The acyl radicals are preferably those of lower aliphatic carboxylic acids, more especially of acetic or propionic acid.

The new compounds possess valuable pharmacological properties and are intended to be used as medicaments or as intermediates for the manufacture of medicaments. Inter alia, they display a strong anti-thrush action and can be used as fungicides. Furthermore, they are capable of dilating the coronary vessels and can be used as appropriate medicaments. In addition, they delay the clotting of blood.

To prepare the new compounds, a compound of the formula $CH_3(CH_2)_n\text{—}C\equiv C\text{—}CHO$, in which $n$ has the above meaning, is condensed with β-nitroethanol; the resulting compound of the formula $$CH_3(CH_2)_n\text{—}C\equiv C\text{—}CH(OH)\text{—}CH(NO_2)\text{—}CH_2OH$$

is reduced to the corresponding 2-amino compound, if desired after having been resolved into its stereoisomers; if desired, the triple bond is converted into a double bond, and/or a resulting amino-diol is converted into an acyl derivative and/or a resulting racemate is resolved into its optical antipodes and/or a resulting base is converted into its salts or a resulting salt into the free base.

Also the intermediates, namely the unsaturated nitro-diols are new. They too, possess valuable pharmacological properties and can be used as medicaments or as intermediates for the manufacture of medicaments. Inter alia, they can augment considerably the specific antibodies in the organism.

The condensation of the unsaturated aldehyde with β-nitroethanol can be performed in as such known manner. The nitro-diol is preferably reduced with zinc and hydrochloric acid or with iron and acetic acid.

Prior to the said reduction the resulting compound of the formula $$CH_3(CH_2)_n\text{—}C\equiv C\text{—}CH(OH)\text{—}CH(NO_2)\text{—}CH_2OH$$

can be resolved into its diastereoisomers, preferably by crystallisation.

The subsequent reactions can be carried out in any desired order of succession. Inter alia, the resulting amino group can be acylated in the known manner. The triple bond can be converted into a double bond, preferably with hydrogen in the presence of a Lindlar catalyst or of a palladium catalyst poisoned with quinoline or pyridine. This procedure yields cis-compounds. To manufacture the trans-isomers, the reduction is advantageously performed with a dimetal hydride, such as lithium-aluminum hydride. The reduction of the intermediates, namely the nitro-alk-4-ynes, in the presence of a Lindlar catalyst is preferably conducted in alcohol, to yield a cis-1:3-dihydroxy-2-nitro-alk-4-ene which, if desired, can be isolated.

The afore-mentioned reductions are preferably carried out in the presence of rectified spirit. The amino-diols obtained in this manner can, if desired, be converted in as such known manner into acyl derivatives or resulting acyl derivatives into the free amino-diols. If desired, a resulting racemate can be resolved into its optical antipodes, for example by treatment with optically active glutamic acid.

Depending on the reaction conditions the amino-diols are obtained in the form of the free bases or in the form of salts thereof, preferably as therapeutically useful acid addition salts with appropriate acids, such as a hydrohalic acid, for example hydrochloride acid, sulfuric acid, a phosphoric acid, perchloric acid, acetic acid, citric acid, oxalic acid, tartaric acid, ascorbic acid, methanesulfonic acid, hydroxyethanesulfonic acid, paratoluenesulfonic acid or salicylic aid, para-aminosalicylic acid or acetylsalicylic acid. The base can be converted into a salt thereof by known method, and a salt in the conventional manner into its base.

The alkyn-1-als used as starting materials can be prepared in as such known manner. Thus, an appropriate alkyl bromide can be condensed with sodium acetylide, the resulting alkyne converted, for example with ethyl magnesium bromide, into a metal compound thereof, the latter being reacted with an orthoformic acid ester and the resulting acetal hydrolysed to the aldehyde with an acid agent.

The new compounds can be used in the form of pharmaceutical preparations containing them in admixture with pharmaceutical carrier material. As carrier materials are concerned, for example, such substances as do not react with the new compounds, for example water, gelatine, lactose, starch, magnesium stearate, talc, vegetable oils, benzyl alcohols, gums, polyalkylene glycols, cholesterol or other known medicament carriers. The pharmaceutical preparations can be for example, in the form of tablets, dragees, powders or suppositories or in liquid form as solutions, suspensions or emulsions. If desired they are sterilised and/or contain auxiliary substances, such as preserving, stabilising, wetting or emulsifying agents. They can also contain other therapeutically valuable substances.

The present invention further covers the modified process in which an intermediate obtained at any stage of the process is used as starting material and the remaining step or steps are carried out, or the process is discontinued at any desired stage.

The following examples illustrate the invention.

*Example 1*

28.0 grams of heptadec-2-ynal-(1) and 10.0 grams of nitroethanol are pre-cooled to 0° C., a cooled suspension of 1 gram of powdered potassium carbonate in 45 cc. of methanol is added, the mixture is kept for 15 minutes and then acidified with 1.5 cc. of concentrated hydrochloric acid in 2.5 cc. of methanol and extracted with ether. The ethereal extracts are washed with water and dried over sodium sulfate. The yellow syrup, obtained by evaporating the ether, is dissolved in 20 cc. of ether, the solution diluted with 200 cc. of pentane and kept for 16 hours at 22° C. The resulting crystals are suctioned off, the mother liquor is evaporated and 125 cc. of pentane are added to the residue, whereupon crystals separate out which are combined with the crystals first obtained. On recrystallisation from pentane, they melt at 77–79° C. They are threo-1:3-dihydroxy-2-nitro-nonadec-4-yne of the formula

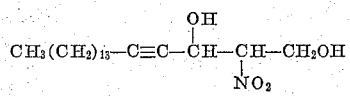

The filtrate obtained above is kept for 48 hours at 0° C., and the resulting crystals are filtered off. The erythro-1:3-dihydroxy-2-nitro-nonadec-4-yne of the formula

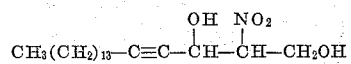

obtained in this manner melts at 48–50° C. after recrystallisation from chloroform-pentane.

2.0 grams of crude threo-1:3-dihydroxy-2-amino-nonadec-4-yne are heated in 50 cc. of absolute tetrahydrofuran with 1.5 grams of lithium-aluminium hydride for 4 hours on a steam bath, decomposed with 4 N-hydrochloric acid while cooling with ice, and slightly concentrated in vacuo; ether is added and the ethereal solution is washed with 4 N-hydrochloric acid, 2 N-sodium carbonate solution and with water. The ethereal extracts are dried over sodium sulfate and then evaporated in vacuo. On recrystallisation from chloroform-pentane, the residue yields colorless threo-trans-1:3-di-hydroxy-2-amino-nonadec-4-ene of the formula

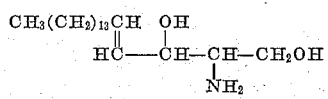

melting at 85–90° C. A slightly less pure product is obtained when the lithium-aluminium hydride solution is treated with about 10 cc. of water (instead of with hydrochloric acid), filtered and then evaporated.

The identical product is obtained by acid isomerisation of the threo-cis-1:3-dihydroxy-2-amino-nonadec-4-ene of the formula

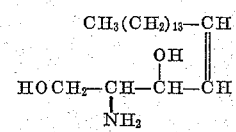

described in Example 5 by refluxing for 45 minutes with dilute sulfuric acid in aqueous dioxane. The heptadec-2-ynal-(1) used as starting material can be prepared in the following manner:

3000 cc. of liquid ammonia are entered into a 6-liter flask equipped with acetone-Dry Ice cooler, 110 grams of sodium are added with stirring, and at the same time acetylene is introduced until the color disappears. 2000 cc. of dimethyl formamide and 520 grams of myristyl bromide are then added, and the ammonia is allowed to evaporate. The mixture is then heated with stirring for 2 hours at 65° C. under a weak current of nitrogen. While cooling with ice, 1000 cc. of water are slowly added dropwise, and the dark brown mixture is extracted with ether. The ethereal extracts are washed 3 times with 2 N-hydrochloric acid and with water until neutral, dried over sodium sulfate, filtered and evaporated. The resulting colorless hexadecyne-(1) is distilled under 0.07 mm. Hg pressure and passes over at 88–90° C.; $n_D^{20}=1.4420$.

A flask with 4 ground necks, equipped with agitator, condenser and dropping funnel, is charged with 5 grams of magnesium activated with iodine, which is covered with ether, and 32 grams of ethyl bromide in 50 cc. of absolute ether are added dropwise. The Grignard solution is slowly treated with 31 grams of hexadecyne-(1) in 50 cc. of absolute ether, and the whole is refluxed for 5 hours. 31 grams of orthoformic acid ethyl ester in 50 cc. of absolute ether are then slowly run in, and the mixture is refluxed overnight. The reaction mixture is decomposed by cautiously adding dropwise an aqueous ammonium chloride solution of about 20% strength, while being cooled with ice and stirred. The ethereal phase is separated and washed twice with water, dried over sodium sulfate, filtered and evaporated. The residue is pre-distilled under a pressure of about 11 mm. Hg at a bath temperature of 150° C. to prevent any excessive foaming during the subsequent high-vacuum distillation. Heptadecynal-acetal boils at 121–135° C. under 0.02 mm. Hg pressure. The colorless oil has a refractive index of 1.4496 at 25° C.

35.5 grams of the acetal obtained in this manner are boiled with 32 cc. of water, 3.2 cc. of 2 N-hydrochloric acid and about 100 cc. of dioxane in a flask with 4 ground necks, equipped with agitator, condenser and introduction tube for 6 hours with stirring at a bath temperature of about 110° C. under nitrogen. The dioxane is then substantially distilled off in a water-jet vacuum at about 50° C., the residue is taken up in ether, the ethereal solution washed with 2 N-sodium carbonate solution and with water until neutral, dried over sodium sulfate, filtered and evaporated. When the residue is distilled, the hexadec-2-ynal-(1) formed passes over at 118–121° C. under a pressure of 0.04 mm. Hg; $n_D^{25}=1.4610$.

*Example 2*

4.0 grams of the threo-1:3-dihydroxy-2-nitro-nonadec-4-yne described in Example 1 are dissolved in 30 cc. of ethanol and, while being cooled with ice and stirred, slowly added dropwise to a mixture of 10 cc. of concentrated hydrochloric acid and 10 cc. of ethanol. At the same time, 8.0 grams of zinc powder are added in small portions and the volume of the reaction mixture is made up by adding 5 cc. of concentrated hydrochloric acid each time at intervals of about 5 to 10 minutes. The whole is then stirred on for about 20 to 30 minutes at room temperature. Any foaming can be controlled by injecting a small amount of alcohol. The reaction mixture is suction-filtered, the surplus zinc powder washed with water and ethanol, and the filtrate is rendered alkaline with 10 N sodium hydroxide solution, extracted with ether, the ethereal extract is washed with water until neutral, dried over sodium sulfate, filtered and evaporated. After recrystallisation from chloroform-pentane, the crystalline residue yields colorless threo-1:3-dihydroxy-2-amino-nonadec-4-yne of the formula

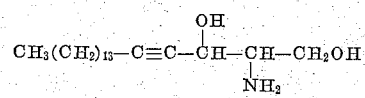

melting at 86–87° C.

Alternatively, the above reduction can be performed with a weakly acetic acid solution of aluminium amalgam, or with iron and acetic acid.

*Example 3*

2.0 grams of crude erythro-1:3-dihydroxy-2-amino-nonadec-4-yne are heated in 50 cc. of absolute tetrahydrofuran with 1.5 grams of lithium-aluminium hydride for 4 hours on a steam bath, decomposed with 4 N-hydrochloric acid with ice-cooling, slightly concentrated under reduced pressure and extracted with ether. The ethereal solution is washed with 4 N-hydrochloric acid, 2 N-sodium carbonate solution and with water, dried over sodium sulfate and evaporated in vacuo, to yield colorless erythro-trans-1:3-dihydroxy-2-amino-nonadec-4-ene of the formula

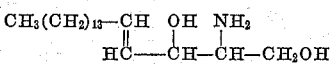

melting at 65–79° C.

A slightly less pure product is obtained when the lithium-aluminium hydride solution is treated with about 10 cc. of water (instead of with hydrochloric acid), filtered and evaporated.

The identical product is obtained by acid isomerisation, by refluxing the erythro-cis-1:3-dihydroxy-2-amino-nonadec-4-ene described in Example 5 in aqueous dioxane with dilute sulfuric acid for 45 minutes.

*Example 4*

When the erythro-1:3-dihydroxy-2-nitro-nonadec-4-yne described in Example 1 is reduced as described in Example 2, crystalline erythro-1:3-dihydroxy-2-amino-nonadec-4-yne of the formula

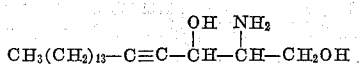

is obtained which, after recrystallisation from ether and pentane, melts at 78–80° C. Alternatively, the above reduction can be performed with a weakly acetic acid solution of aluminium amalgam, or with iron and acetic acid.

*Example 5*

1.50 grams of the threo-1:3-dihydroxy-2-amino-nonadec-4-yne described in Examples 1 and 2 are dissolved in 40 cc. of rectified spirit, treated with 250 mg. of Lindlar catalyst, and agitated at room temperature under normal pressure in a current of hydrogen. After about 1 hour, the absorption of hydrogen ceases. The solution is freed from the catalyst by filtration and evaporated in vacuo at 40–50° C. The solid, colorless residue is crystallised from chloroform-pentane; it melts at 78–80° C. The crystalline product possesses the structure of threo-cis-1:3-dihydroxy-2-amino-nonadec-4-ene of the formula

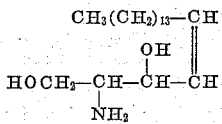

In an analogous manner the erythro-1:3-dihydroxy-2-amino-nonadec-4-yne described in Example 4, after having been recrystallised from acetonitrile, yields erythro-cis-1:3-dihydroxy-2-amino-nonadec-4-ene of the formula

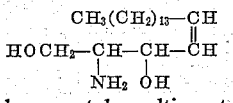

which forms colorless crystals melting at 71–73° C.

*Example 6*

28.0 grams of monadec-2-ynal-(1) and 10.0 grams of nitroethanol are pre-cooled to 0° C., mixed with a cooled suspension of 1 gram of powdered potassium carbonate in 45 cc. of methanol. 15 minutes later the solution is acidified with 1.5 cc. of concentrated hydrochloric acid in 2.5 cc. of methanol and extracted with ether. The ethereal extracts are washed with water and dried over sodium sulfate. The yellow syrup, obtained by evaporating the ether, is dissolved in 20 cc. of pentane and kept for 16 hours at 22° C. The separating crystals are filtered off, and the mother liquor is evaporated and treated with 125 cc. of pentane, whereupon further crystals are separated which are combined with those first obtained. After having been recrystallised from pentane, they melt at 81–82° C. They are the threo-1:3-dihydroxy-2-nitro-heneicos-4-yne of the formula

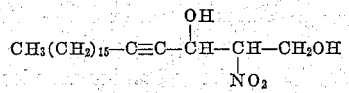

2.0 grams of crude threo-1:3-dihydroxy-2-amino-heneicos-4-yne are heated in 50 cc. of absolute tetrahydrofuran with 1.5 grams of lithium-aluminium hydride for 4 hours on a steam bath, decomposed with 4 N-hydrochloric acid while being cooled with ice, and slightly concentrated in vacuo, ether is added, and the ethereal solution is washed with 4 N-hydrochloric acid, 2 N-sodium carbonate solution and with water. The ethereal extracts are dried over sodium sulfate and evaporated under reduced pressure. After recrystallisation from chloroformpentane, the residue yields colorless threo-trans-1:3-dihydroxy-2-amino-heneicos-4-ene of the formula

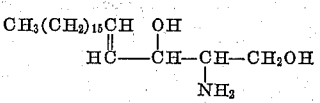

melting at 92–95° C. A slightly less pure product is obtained when the lithium-aluminium hydride solution is treated with about 10 cc. of water (instead of with hydrochloric acid), filtered and evaporated.

The identical product is obtained when the threo-cis-1:3-dihydroxy-2-amino-heneicos-4-ene of the formula

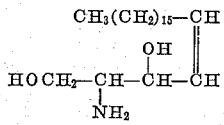

described in Example 8 is subjected to acid isomerisation by being refluxed for 45 minutes with dilute sulfuric acid in aqueous dioxane.

The nonadec-2-ynal-(1) used as starting material can be prepared in the following manner:

3000 cc. of liquid ammonia are entered into a 6-liter flask equipped with acetone-Dry Ice cooler, 110 grams of sodium are added with stirring, and at the same time acetylene is introduced until the color disappears. 2000 cc. of dimethyl formamide and 1040 grams of hexadecyl bromide are then added and the ammonia is allowed to evaporate. The mixture is heated for 2 hours at 65° C. under a weak current of nitrogen with stirring. While cooling with ice, 1000 cc. of water are slowly added dropwise, and the dark brown mixture is extracted with ether. The ethereal extracts are washed 3 times with 2 N-hydrochloric acid and with water until neutral, dried over sodium sulfate, filtered and evaporated. The resulting colorless octadecyne-(1) is distilled under a pressure of 14 mm. Hg and passes over at 172–180° C.; $n_D^{20}=1.4446$.

In a flask with 4 ground necks, equipped with agitator, condenser and dropping funnel, 5 grams of magnesium activated with iodine are covered with ether, and 32 grams of ethyl bromide in 50 cc. of absolute ether are added dropwise. The Grignard solution is slowly treated with 40 grams of octadecyne-(1) in 50 cc. of absolute ether and refluxed for 8 hours. 31 grams of orthoformic acid ethyl ester in 50 cc. of absolute ether are then slowly run in, and the whole is refluxed overnight. The reaction mixture is decomposed by cautiously adding dropwise an aqueous ammonium chloride solution of about 20% strength while cooling with ice and stirring. The ethereal phase is separated and washed twice with water, dried over sodium sulfate, filtered and evaporated. The residue is predistilled under a pressure of about 11 mm. Hg at a bath temperature of 150° C. to prevent any excessive foaming during the subsequent high-vacuum distillation. Nonadecynal-acetal boils at 155–170° C. under 0.07 mm. Hg pressure. The colorless oil has refractive index of 1.4495 at 25° C.

35.5 grams of the acetal obtained in this manner are boiled with 32 cc. of water, 3.2 cc. of 2 N-hydrochloric acid and about 100 cc. of dioxane in a flask with 4 ground necks, equipped with agitator, condenser and introduction tube, for 6 hours with stirring at a bath temperature of about 110° C. in a current of nitrogen. The dioxane is substantially distilled off in a water-jet vacuum at about 50° C. and the residue is taken up in ether. The ethereal solution is washed with 2 N-sodium carbonate solution and water until neutral, dried over sodium sulfate, filtered and evaporated. Distillation of the residue yields monadec-2-ynal-(1) which passes over at 142–150° C. under a pressure of 0.2 mm. Hg; $n_D^{25}=1.4612$.

*Example 7*

4.0 grams of the threo-1:3-dihydroxy-2-nitro-heneicos-4-yne described in Example 1 are dissolved in 30 cc. of ethanol and, while cooling with ice and stirring, slowly added dropwise to a mixture of 10 cc. of concentrated hydrochloric acid and 10 cc. of ethanol. At the same time, 8.0 grams of zinc powder are added in small portions and the reaction mixture is made up at intervals of about 5–10 minutes 4 times with 5 cc. of concentrated hydrochloric acid on each occasion. The whole is then stirred on for 20 to 30 minutes at room temperature. Any foaming can be controlled by injecting a small amount of alcohol. The reatcion mixture is suction-filtered, the surplus zinc powder washed with water and ethanol, and the filtrate rendered alkaline with 10 N-sodium hydroxide solution, extracted with ether, and the ethereal extract is washed with water until neutral, dried over sodium sulfate, filtered and evaporated. On recrystallisation from chloroform-pentane, the crystalline residue yields colorless threo-1:3-dihydroxy-2-amino-heneicos-4-yne of the formula

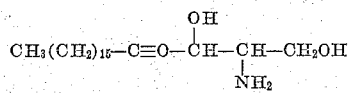

melting at 81–83° C.

Alternatively, the above reduction can be performed with a weakly acetic acid solution of aluminium amalgam, or with iron and acetic acid.

*Example 8*

1.50 grams of the threo-1:3-dihydroxy-2-amino-heneicos-4-yne described in Examples 1 and 2 are dissolved in 40 cc. of rectified spirit, 250 mg. of Lindlar catalyst are added, and the whole is agitated at room temperature under atmospheric pressure in a current of hydrogen. After about 1 hour the absorption of hydrogen ceases. The solution is freed from the catalyst by filtration and evaporated in vacuo at 40 to 50° C. From chloroform-pentane the solid colorless residue yields crystals melting at 78–82° C. having the structure of threo-cis-1:3-dihydroxy-2-amino-heneicos-4-ene of the formula

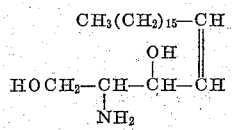

*Example 9*

31.0 grams of heneicos-2-ynal-(1) and 10.0 grams of nitroethanol are pre-cooled to 0° C., a cooled suspension of 1 gram of powdered potassium carbonate in 45 cc. of methanol is added, 15 minutes later the whole is acidified with 1.5 cc. of concentrated hydrochloric acid in 2.5 cc. of methanol, and the solution is extracted with ether. The ethereal extracts are washed with water and dried over sodium sulfate. The yellow syrup obtained after evaporating is diluted with 200 cc. of pentane and kept for 16 hours at 22° C. The separating crystals are filtered off, the mother liquor is evaporated and mixed with 125 cc. of pentane, whereupon more crystals separate out which are combined with those first obtained. After having been recrystallised from pentane, they melt at 72–77° C. The crystalline product is threo-1:3-dihydroxy-2-nitro-tricos-4-yne of the formula

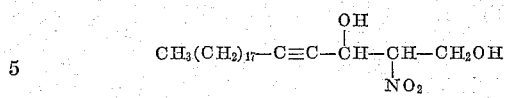

The above filtrate is kept for 48 hours at 0° C., and the crystals are filtered off. The resulting erythro-1:3-dihydroxy-2-nitro-tricos-4-yne of the formula

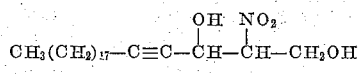

melts at 47–50° C. after recrystallisation from chloroform-pentane.

The heneicos-2-ynal-(1) used as starting material can be prepared in the following manner:

3000 cc. of liquid ammonia are entered into a 6-liter flask equipped with acetone-Dry Ice cooler, 110 grams of sodium are added with stirring, and at the same time acetylene is introduced until the color disappears. 2000 cc. of dimethyl formamide and 1130 grams of octadecyl bromide are then added, and the ammonia is allowed to evaporate. The mixture is then heated with stirring for 2 hours at 65° C. under a weak current of nitrogen. While cooling with ice, 1000 cc. of water are slowly added dropwise, and the dark brown mixture is extracted with ether. The ethereal extracts are washed three times with 2 N-hydrochloric acid and with water until neutral, dried over sodium sulfate, filtered and evaporated. The resulting colorless eicosyne-(1) is distilled under 0.2 mm. Hg pressure and passes over at 132–140° C.; $n_D^{20}=1.4476$.

5 grams of magnesium activated with iodine is introduced into a flask with 4 ground necks, equipped with agitator, condenser and dropping funnel, and then covered with ether, and 32 grams of ethyl bromide in 50 cc. of absolute ether are added dropwise. The Grignard solution is slowly treated with 44 grams of eicosyne-(1) in 50 cc. of absolute ether and refluxed for 10 hours. 31 grams of orthoformic acid ethyl ester in 50 cc. of absolute ether are then slowly run in, and the whole is refluxed overnight. The reaction mixture is decomposed by cautiously adding dropwise an aqueous ammonium chloride solution of about 20% strength while cooling with ice and stirring. The ethereal phase is separated and washed twice with water, dried over sodium sulfate, filtered and evaporated. The residue is pre-distilled under a pressure of about 11 mm. at a bath temperature of 150° C. to prevent any excessive foaming during the high-vacuum distillation. The heneicosynal-acetal boils at 178–180° C. under a pressure of 0.02 mm. Hg. The colorless oil has a refractive index of 1.4513 at 25° C.

35.5 grams of the acetal obtained in this manner are boiled in 32 cc. of water, 3.2 cc. of 2 N-hydrochloric acid and about 100 cc. of dioxane in a flask with 4 ground necks, equipped with agitator, condenser and introduction tube for 6 hours with stirring at a bath temperature of about 110° C. in a nitrogen atmosphere. The dioxane is then substantially distilled off in a water-jet vacuum at about 50° C., the residue is taken up in ether, and the ethereal solution is washed with 2 N-sodium carbonate solution and with water until neutral, dried over sodium sulfate, filtered and evaporated. On distillation of the residue the heneicos-2-ynal-(1) formed passes over at 168—174° C. under a pressure of 0.2 mm. Hg; $n_D^{25}=1.4661$.

What we claim is:

1. A member selected from the group consisting of erythro-1,3-dihydroxy-2-amino-nonadec-4-yne and addition salts thereof with pharmaceutically acceptable acids.

2. A member selected from the group consisting of threo-1,3-dihydroxy-2-amino-nonadec-4-yne and its addition salts with pharmaceutically acceptable acids.

3. A member selected from the group consisting of erythro-trans 1,3-dihydroxy-2-amino-nonadec-4-ene and addition salts thereof with pharmaceutically acceptable acids.

4. A member selected from the group consisting of threo-cis-1,3-dihydroxy-2-amino-nonadec-4-ene and addition salts with pharmaceutically acceptable acids.

5. A member selected from the group consisting of 1,3-dihydroxy-2-amino-heneicos-4-yne and addition salts with pharmaceutically acceptable acids.

6. A member selected from the group consisting of threo-1,3-dihydroxy-2-amino-heneicos-4-yne and addition salts thereof with pharmaceutically acceptable acids.

7. A member selected from the group consisting of 1,3-dihydroxy-2-amino-heneicos-4-ene and addition salts thereof with pharmaceutically acceptable acids.

8. A member selected from the group consisting of threo-cis-1,3-dihydroxy-2-amino-heneicos-4-ene addition salts with pharmaceutically acceptable acids.

9. A member selected from the group consisting of 1,3-dihydroxy-2-amino-tricos-4-yne and addition salts thereof with pharmaceutically acceptable acids.

References Cited in the file of this patent

UNITED STATES PATENTS

| | | |
|---|---|---|
| 2,163,720 | Vaughn | June 27, 1939 |
| 2,194,314 | Maxwell | Mar. 19, 1940 |
| 2,196,554 | Guinot | Apr. 9, 1940 |
| 2,232,867 | Peppe | Feb. 25, 1941 |
| 2,375,536 | De Groote | May 8, 1945 |

OTHER REFERENCES

Ahmad: "J. Indian Chem. Soc.," vol. 31, pages 309–310 (1954).

Grob et al.: I, "Experientia," vol. 12, pages 334–335 (1956).